United States Patent
Lund et al.

(10) Patent No.: US 8,866,425 B2
(45) Date of Patent: Oct. 21, 2014

(54) SYSTEM FOR DRIVING ELONGATED ELECTRIC MACHINES

(75) Inventors: Richard Lund, Trondheim (NO); Alexey Matveev, Trondheim (NO); Roy Nilsen, Hundhammeren (NO); Sigurd Övrebö, Levanger (NO)

(73) Assignee: SmartMotor AS, Trondheim (NO)

( * ) Notice: Subject to any disclaimer, the term of this patent is extended or adjusted under 35 U.S.C. 154(b) by 115 days.

(21) Appl. No.: 13/516,822

(22) PCT Filed: Dec. 3, 2010

(86) PCT No.: PCT/NO2010/000443
§ 371 (c)(1),
(2), (4) Date: Jul. 12, 2012

(87) PCT Pub. No.: WO2011/074972
PCT Pub. Date: Jun. 23, 2011

(65) Prior Publication Data
US 2012/0268049 A1    Oct. 25, 2012

(30) Foreign Application Priority Data
Dec. 16, 2009 (NO) .................................. 20093537

(51) Int. Cl.
*H02P 6/08* (2006.01)
*H02P 6/18* (2006.01)

(52) U.S. Cl.
USPC ............ 318/400.26; 318/51; 318/400.3; 318/490; 166/66.7; 166/244.1

(58) Field of Classification Search
USPC ......... 318/51, 490, 400.26, 400.3; 166/244.1, 166/66.7
See application file for complete search history.

(56) References Cited

U.S. PATENT DOCUMENTS

| 5,621,777 | A | * | 4/1997 | Ring | 376/277 |
| 6,043,995 | A | * | 3/2000 | Leuthen | 363/37 |
| 6,045,333 | A | * | 4/2000 | Breit | 417/44.1 |
| 6,630,890 | B1 | * | 10/2003 | Endo et al. | 340/853.9 |

(Continued)

FOREIGN PATENT DOCUMENTS

| DE | 3113909 A1 | 9/1982 |
| EP | 1901417 A1 | 3/2008 |
| GB | 2362901 A | 12/2001 |
| WO | 2008148613 A2 | 12/2008 |

OTHER PUBLICATIONS

International Search Report and Written Opinion dated Mar. 11, 2011.

*Primary Examiner* — Paul Ip
(74) *Attorney, Agent, or Firm* — Alix, Yale & Ristas, LLP

(57) ABSTRACT

Complete drive system, called motor-drive unit, for use in remote locations with limited radial space like downhole, narrow tunnels, pipelines and other applications with similar conditions. Given the spatial limitations the unit must have elongated shape. It includes a number of motors connected mechanically in series and a lower number of inverters, driving groups of the motors so that load is equally distributed along axis of the unit. Motors within each group can be electrically connected in series or in parallel. The motor-drive unit is supposed to be fed by DC voltage via a cable with length up to several km; therefore, it includes a buck converter for stabilization of voltage inside the unit and a power-line communication module to be controllable from the surface.

18 Claims, 5 Drawing Sheets

(56) References Cited

U.S. PATENT DOCUMENTS

Figure 1:
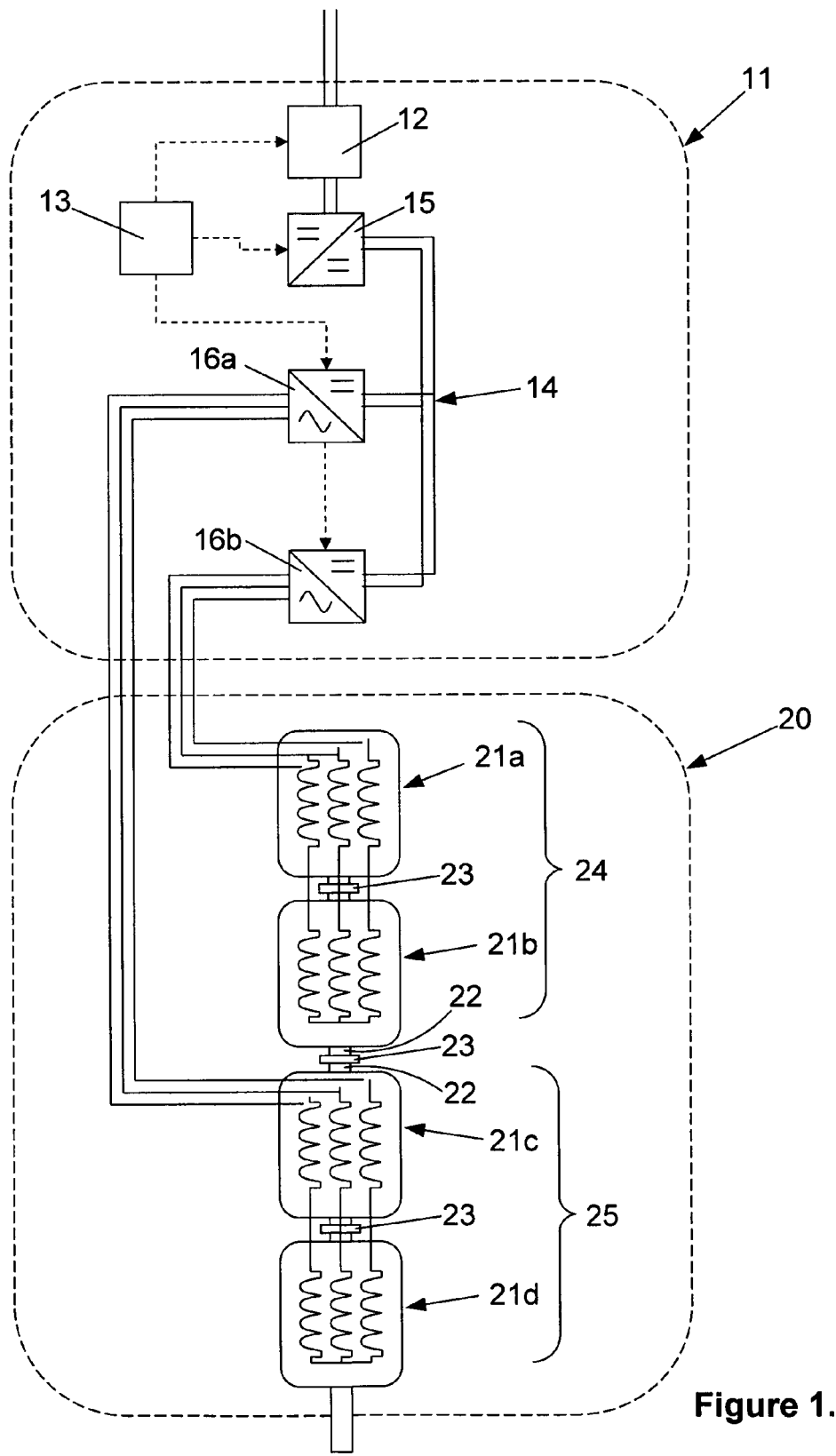

| | | | |
|---|---|---|---|
| 6,898,968 B2 * | 5/2005 | Biester et al. | 73/168 |
| 6,899,171 B2 * | 5/2005 | Biester et al. | 166/66.7 |
| 6,978,979 B2 * | 12/2005 | Biester | 251/129.11 |
| 7,007,922 B2 * | 3/2006 | Biester et al. | 251/129.11 |
| 7,048,004 B2 * | 5/2006 | Biester | 137/625.68 |
| 7,172,169 B2 * | 2/2007 | Biester | 251/129.11 |
| 7,231,842 B2 * | 6/2007 | Biester et al. | 74/89.25 |
| 7,433,214 B2 * | 10/2008 | Kunow et al. | 363/65 |
| 7,453,170 B2 * | 11/2008 | Kunow et al. | 307/151 |
| 7,576,447 B2 * | 8/2009 | Biester et al. | 307/12 |
| 7,615,893 B2 * | 11/2009 | Biester et al. | 307/82 |
| 7,759,827 B2 * | 7/2010 | Kunow et al. | 307/147 |
| 8,106,536 B2 * | 1/2012 | Kunow et al. | 307/82 |
| 8,353,336 B2 * | 1/2013 | Neuhaus et al. | 166/66.4 |
| 8,408,312 B2 * | 4/2013 | Fielder et al. | 166/369 |
| 8,536,731 B2 * | 9/2013 | Biester et al. | 307/12 |
| 2005/0029476 A1 * | 2/2005 | Biester et al. | 251/58 |
| 2006/0175064 A1 * | 8/2006 | Yuratich | 166/381 |
| 2007/0007042 A1 * | 1/2007 | Gard | 175/61 |
| 2007/0071612 A1 * | 3/2007 | Yuratich | 417/53 |
| 2007/0096571 A1 * | 5/2007 | Yuratich | 310/87 |
| 2008/0247880 A1 * | 10/2008 | Leuthen et al. | 417/44.11 |
| 2008/0284264 A1 * | 11/2008 | Yuratich et al. | 310/87 |
| 2008/0284268 A1 * | 11/2008 | Yuratich et al. | 310/156.09 |
| 2008/0286131 A1 * | 11/2008 | Yuratich et al. | 417/410.1 |
| 2009/0109713 A1 * | 4/2009 | Schnetzka et al. | 363/34 |
| 2010/0019573 A1 * | 1/2010 | Biester et al. | 307/12 |
| 2010/0019930 A1 * | 1/2010 | Biester et al. | 340/850 |
| 2010/0206554 A1 * | 8/2010 | Neuhaus et al. | 166/244.1 |
| 2011/0033314 A1 * | 2/2011 | Plitt et al. | 417/15 |
| 2011/0089873 A1 * | 4/2011 | Blocher et al. | 318/400.3 |
| 2011/0170320 A1 * | 7/2011 | Coenen et al. | 363/35 |
| 2011/0297391 A1 * | 12/2011 | Fielder et al. | 166/369 |
| 2012/0013284 A1 * | 1/2012 | Campbell | 318/490 |
| 2013/0119901 A1 * | 5/2013 | Gries et al. | 318/400.3 |
| 2013/0119902 A1 * | 5/2013 | Gries et al. | 318/400.3 |
| 2014/0015449 A1 * | 1/2014 | Biester et al. | 318/51 |

* cited by examiner

SYSTEM FOR DRIVING ELONGATED ELECTRIC MACHINES

The invention relates to a system for driving elongated electrical machines, motors and generators, capable to provide considerable power in a very narrow space, according to the preamble of claim 1. Possible application areas are, first of all, downhole (pumps, drills, etc) but also rock drilling (including directional drilling), operation inside long pipelines (including power generation), flexible hand tools and many other.

BACKGROUND

The electric motors used for driving downhole mechanisms are very elongated, sometimes of a length of more than one hundred times their diameter. If only one section of electric machine is used, its shaft is as long as necessary to fulfill the given power requirements, which may be 10 m and even longer. There are two negative effects associated with the long shaft; angular twisting of the shaft and deflections of the shaft. Angular twisting is especially problematic in permanent magnet machines where control strategies are based on information of exact position of the magnetic poles relative to the stator winding. The problem aggravates in permanent magnet machines with many poles (eight and more).

U.S. Pat. No. 6,388,353 B1 (Liu et al. (2002)) suggests a solution to the problem of a long twistable shaft by using the permanent magnets of adjacent rotor sections being offset from each other by a predetermined angular displacement, wherein the sum of the predetermined angular displacements between each rotor section is approximately equal to the angular twisting of the shaft under a standard load.

Deflections may be the problem in all machines types requiring support bearings along the shaft or use of sectioned shafts. For example, patent application US 2007096571 A1 (Yuratich (2004)) and US 2008111434 A1 (Head (2008)) present ideas on connection of the sections.

The use of sectioned shafts with rotors and sectioned stators inside the same housing or totally separate machines with connected shafts raises a problem of controlling the sections or the machines. The idea of independent control of each section appears in the six patent applications cited below. In these patent applications often other problems are solved at the same time, for example operation of the stages/sections at different speeds.

Patent application US 2002011337 A1 (Grant (2001)) claims a plurality of inverters adapted to be installed downhole, one for each motor, such that each motor can be controlled separately of the others.

Patent application US 2002066568 A1 (Buchanan et al. (2001)) suggests that each stage of the plurality of stages is independently controllable.

Patent application CA 2,375,308 A1 (Pettigrew (2002)) suggests that motors are mechanically connected to one another and supplied with electrical power independently from one another, where the supply is from the surface.

Already cited patent application US 2007096571 A1 presents the idea of separate supply leads for supplying first and second sections with electrical power from the surface, which is in a way repeating the idea in CA 2,375,308 A1.

Patent application EP 1901417 A1 (Schmitt (2006)) claims separate power supplies and control systems for each motor sub-unit, wherein the control systems are arranged to drive the phases of the motor sub-units together.

Patent application WO 2008148613 A2 (Neuhaus et al. (2008)) also uses a principle of independent control of motor sections. Inverters are disposed directly at each motor section. Switched reluctance drive technology is used.

All the abovementioned patents have downhole applications as the main area of use. The ideas from the above patents relevance to the current application may be summarized in the following set of concepts:

- motor is controlled from one source (inverter) and uses skewed magnets to compensate for the angular shaft twisting;
- motor is controlled from one source (inverter) and consists of several sections to avoid rotor/shaft deflections;
- motor has two sets of windings, each fed separately from the surface or several sections each fed separately from the surface;
- a certain tool has several sections, each comprising a motor together with some other mechanism, where each section is controlled independently from the others by a separate inverter; and
- motor has several sections, each controlled independently from a separate inverter located either at the section or in a separate unit installed near the motors.

The set of ideas presented in the current patent is different from any of the listed concepts.

OBJECT

The main object of the invention is to provide a system that partly or entirely solves the above mentioned problems of prior art.

An object of the invention is to provide a simplified assembly of the system compared to elongated sectioned motors using a common shaft or common stator.

It is an object of the invention to provide accurate and efficient control of motors due to minimized influence of twisting of the shaft.

An object of the invention is to provide a system with reduced number of inverters compared to concepts using one inverter for each motor section, and a reduced number of cables extending along a tool due to the fact of using fewer inverters.

It is further an object of the invention to provide equalized load on the motors along the system axis due to dependent control of inverters and respective groups of motors contrary to the earlier concepts with independent control of the stages.

Finally it is an object of the present invention to provide a complete unit designed as a one whole, where advantages of partial solutions are reinforcing each other and making the total solution even more powerful.

THE INVENTION

As mentioned earlier there are two main problematic effects in very long electrical machines: angular twisting of the shaft and deflections of the shaft. It is noteworthy that with an increase of the length of an unsupported shaft, the problem of deflections comes much earlier than that of twisting. This fact is used in the current invention. It is proposed to use not one motor with sectioned rotor but several separate motors connected together by ends of their shafts, with a control system of a specific topology, and to operate the motors according to a specific control algorithm.

It is possible to align stators and rotors of two or more motor sections mechanically so accurately that they may be efficiently controlled by one inverter only. At the same time when too many motors are mechanically connected in series there may be angular shifts making control from one inverter impossible. The limit of the number of sections controlled from one inverter depends on the length of the section, rotational speed, number of magnetic poles and types of connections between the shafts. So, all motors in the system according to the invention must be divided into groups, wherein each group is driven from a separate inverter. Accordingly, the number of inverters is several times lower than the number of motors.

Windings of the motors in one group may be connected either in series or in parallel. In the former case only one motor in the group is directly connected to the inverter, while in the later all windings are connected to the inverter. Parallel or series connection may be chosen depending on operational speed and available voltage. For higher speeds parallel connection is preferable, while series connection is preferable for lower speeds.

To insure accuracy of control, one motor in each group may be provided with a position sensor. Alternatively, the control may be sensorless. The choice between sensor or sensorless control is based on the machine type and the possibility of using controllers with high processing power.

Further, it is desirable to equalize the load on the motors along the system. It may be done in several ways by synchronizing the operation of the inverters. For example, one inverter ("master") is provided with a speed or torque reference from the control system while the other inverters ("followers") are provided with an equal torque reference from the "master" inverter. In case the size of the motor groups is different, the torque references provided to the inverters by the control system may be proportional to the length of the active parts of the motors in the group fed from the respective inverters.

The main feature of the present invention is the combination of series connection of motor windings and parallel connection of the inverters, where the inverters are controlled dependently from each other to equally share load between the motors.

As noted earlier, depending on the number of poles, number of motors fed from the same inverter can be different; the higher the number of poles is, the fewer motors can be in the group. For eight poles and higher, the number of motors in a group can be only two or, maximum three. At the same time, for two-pole designs, the number of motors in one group might reach four, five or even more. Possible combinations are given in Table 1 below.

TABLE 1

| Number of motor sections needed to achieve the required power | Variants of number of motors in each group | Possible arrangement of the groups (not all variants shown) | Number of individual inverters required in the system |
| --- | --- | --- | --- |
| 2 | 1 | 1 + 1 | 2 |
| 3 | 2 or 1 | 2 + 1 | 2 |
| 4 | 2 | 2 + 2 | 2 |
| 5 | 3, 2 or 1 | 3 + 2 or<br>2 + 2 + 1 | 2 or 3 |
| 6 | 3 or 2 | 3 + 3 or<br>2 + 2 + 2 | 2 or 3 |
| 7 | 4, 3, 2 or 1 | 4 + 3 or<br>3 + 2 + 2 or<br>2 + 2 + 2 + 1 | 2 or<br>3 or 4 |
| 8 | 4, 3 or 2 | 4 + 4 or<br>3 + 3 + 2 or<br>2 + 2 + 2 + 2 | 2 or<br>3 or 4 |
| 9 | 5, 4, 3, 2 or 1 | 5 + 4 or<br>3 + 3 + 3 or<br>3 + 2 + 2 + 2 or<br>2 + 2 + 2 + 2 + 1 | 2 or<br>3 or<br>4 or 5 |

TABLE 1-continued

| Number of motor sections needed to achieve the required power | Variants of number of motors in each group | Possible arrangement of the groups (not all variants shown) | Number of individual inverters required in the system |
| --- | --- | --- | --- |
| 10 | 5, 4, 3 or 2 | 5 + 5 or<br>4 + 3 + 3 or<br>3 + 3 + 2 + 2 or<br>2 + 2 + 2 + 2 + 2 | 2 or<br>3 or<br>4 or 5 |

The table may be continued based on the same approach

The system according to the invention is supplied with DC voltage via a cable extending up to several km, and is therefore provided with a DC/DC buck converter for the stabilization of voltage inside the system (preferably on a common DC bus) and includes a power-line communication module being controllable from the surface. The individual inverters are fed from the common DC bus, and are therefore "DC/AC inverters".

The motor part of the system may further be provided with a gearbox for low-speed applications.

The advantages the presented invention brings along are:
simplified assembly of the system compared to elongated sectioned motors using a common shaft or common stator,
accurate and efficient control of motors of the system due to minimized influence of twisting of the shaft,
reduced number of inverters (both power stages and control boards) compared to concepts using one inverter for each motor section,
reduced number of cables going along a tool due to using fewer inverters,
equalized load on the motors along the system axis due to dependent control of the inverters and respective groups of motors contrary to the earlier concepts with independent control of the stages.

Furthermore, the invention presents the complete unit designed as a one whole, where advantages of partial solutions are reinforcing each other and making the total solution even more powerful.

Further advantages and preferred features of the invention will appear from the example description below.

EXAMPLE

Figure 2:
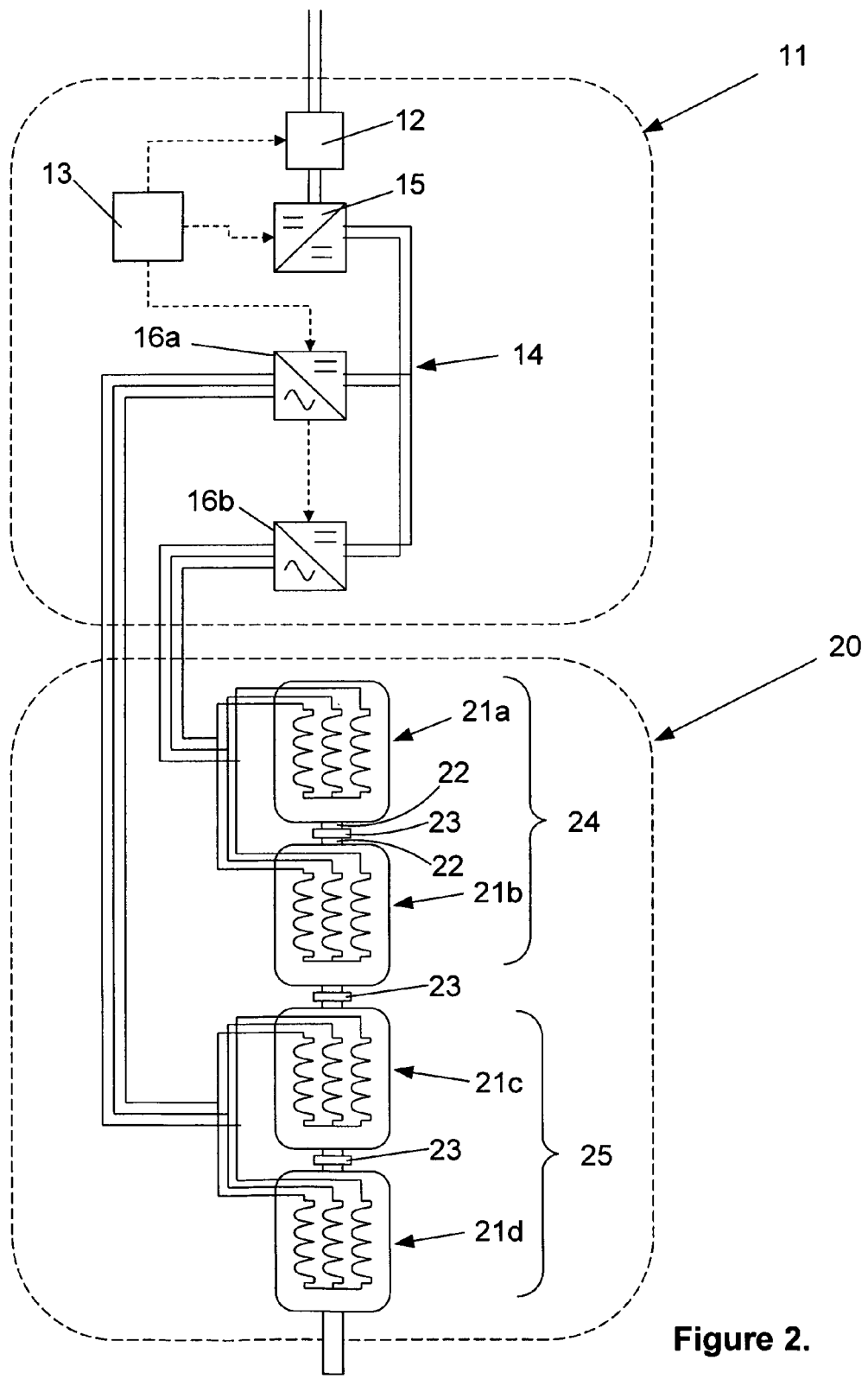
Figure 3:
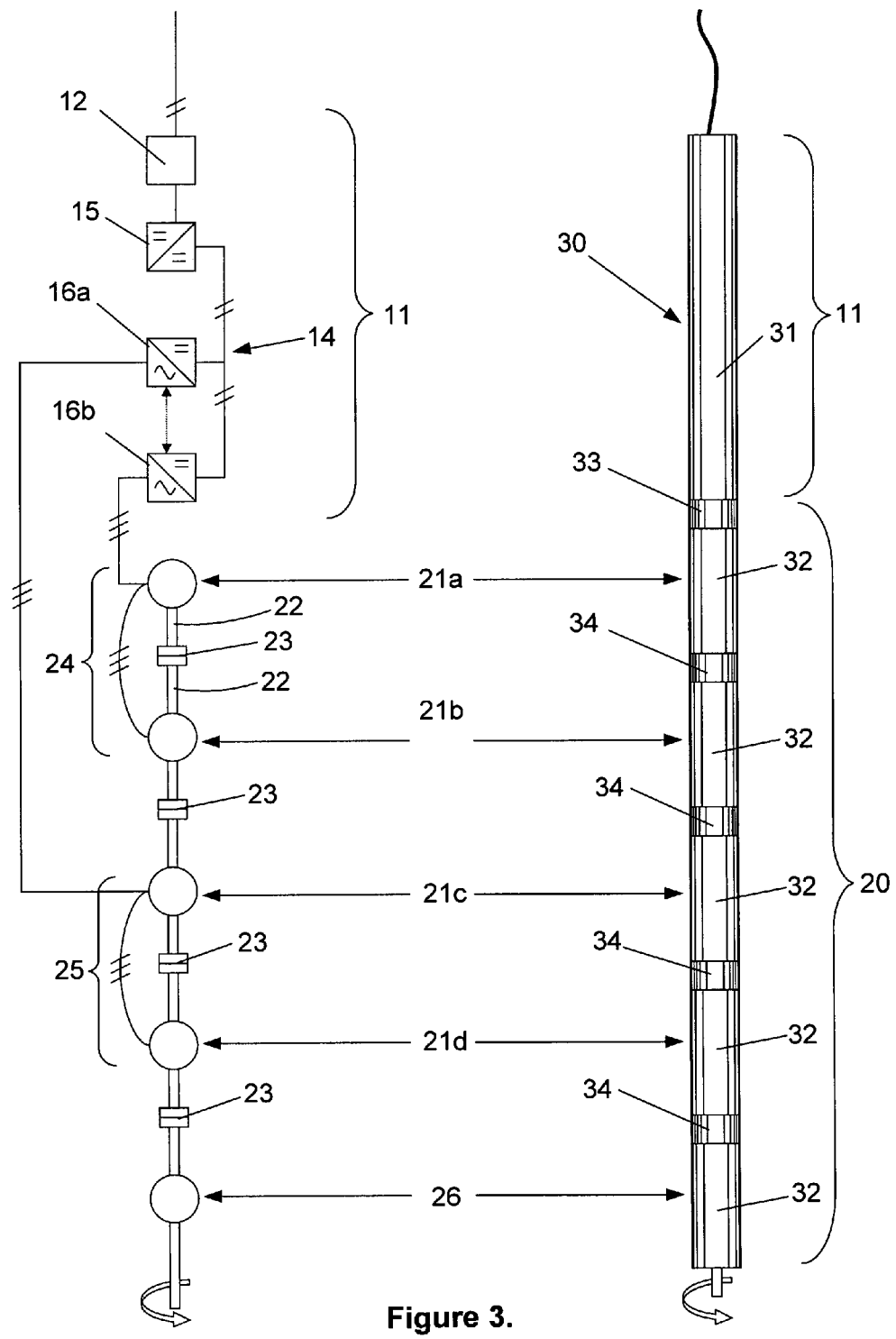
Figure 4A:
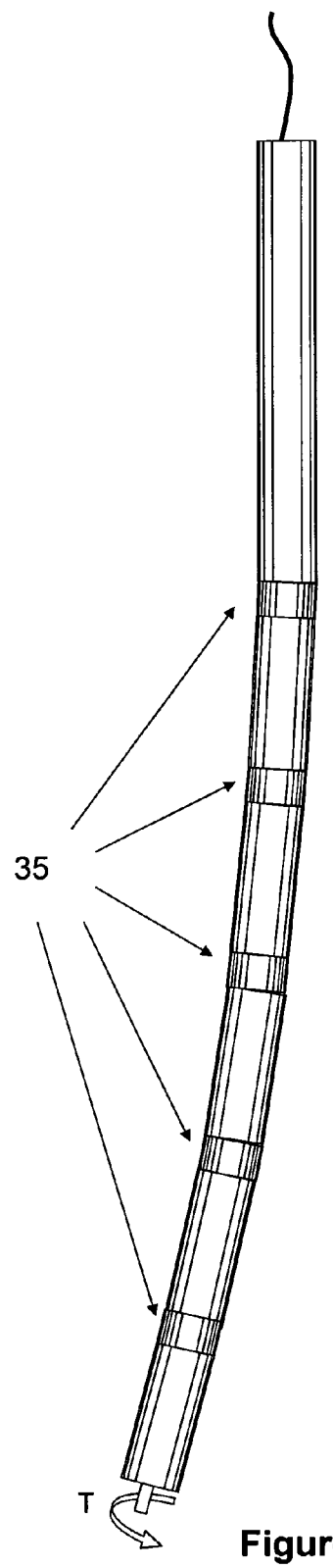
Figure 4B:
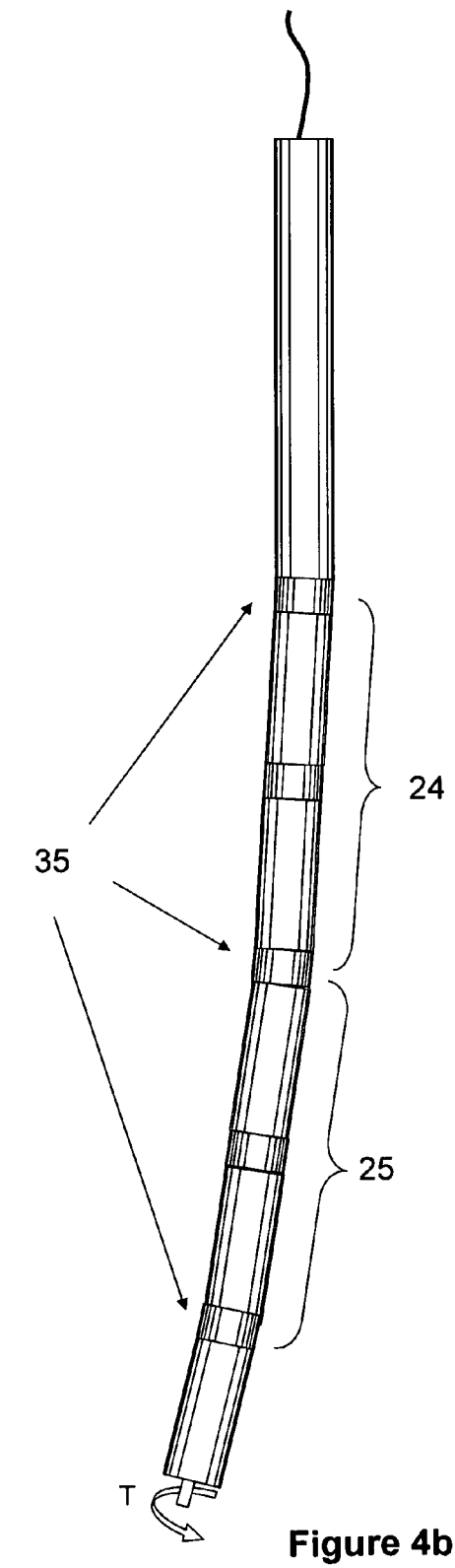
Figures 5A, 5B:
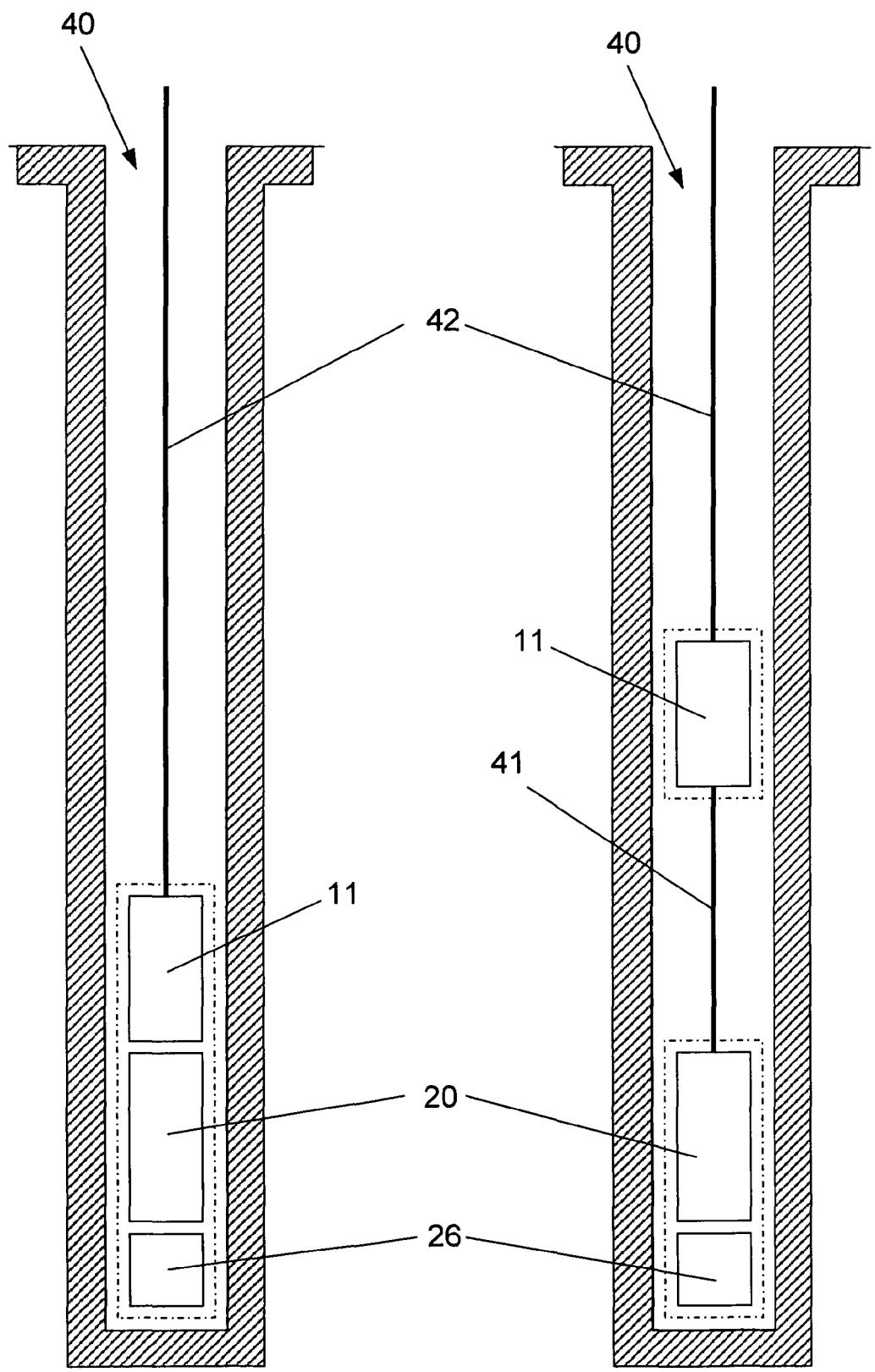

The invention will below be described in detail with reference to accompanying drawings:

FIG. 1 shows a complete system layout with series connection of motors in the group, FIG. 2 shows a complete system layout with parallel connection of motors in the group, FIG. 3 is a system schematics related to accommodation in a housing, FIG. 4a-b show a "bendable" electromechanical unit provided with flexible connections, and provided with flexible connections only between motor groups, respectively, and FIG. 5a-b show location of the units in a well with electronics and motors together, and electronics separately to exclude negative thermal influence, respectively.

Reference is now made to FIG. 1 which shows a layout of a system according to the invention. The system includes two main units in the form of a power and control electronics unit 11 and an electromechanical unit 20, which units 11 and 20 are connected by means of power and control cables.

The power and control electronics unit 11 includes a power line communication module 12, control system 13, common DC bus 14, DC/DC buck converter 15 and plurality of DC/AC inverters 16a, 16b fed from the common DC bus 14. The system is supplied with DC voltage from the surface via a DC cable 42 (see FIG. 5a-b) extending up to several km, and the electronics unit 11 is therefore provided with the DC/DC buck converter 15 for the stabilization of the voltage inside the system, i.e. on the common DC bus 14. The power-line communication module 12 is preferably controllable from the surface. The individual inverters 16a-b are fed from the common DC bus 14, and are therefore "DC/AC inverters".

The electromechanical unit 20 includes further a plurality of electric rotating motors 21a-d, such as, for example, permanent magnet motors or induction motors, axially aligned and mounted mechanically in series by connecting ends of their shafts 22 via couplings/joints 23.

The motors 21a-d are preferably divided into groups 24, 25. In FIG. 1 the motors 21a and 21b, constituting the $1^{st}$ group 24, are fed from the inverter 16a, while the motors 21c and 21d, constituting the $2^{nd}$ group 25, are fed from the inverter 16b. Inside each group 24, 25, windings of the motors 21-a-d are electrically connected in series.

Further, it is desirable to equalize the load on the motors 21a-d along the electromechanical unit 20. This can be done in several ways by synchronizing the operation of the inverters 16a-b. For example, one inverter 16a can be arranged to be "master" and is provided with a speed or torque reference from the control system 13, while the other inverters 16b are arranged to be "followers" and are provided with an equal torque reference from the "master" inverter 16a. In case the size of the motor groups 24, 25 is different, the torque references provided to the inverters 16a by the control system 13 may be proportional to the length of the active parts of the motors 21a-d in the group 24, 25 fed from the respective inverters 16b.

To insure accuracy of control, one motor 21a-d in each group 24, 25 may be provided with a position sensor (not shown). In very high temperature applications are only relatively simple control circuits available, resulting in that sensorless control is not possible to realize and a position sensor must accordingly be used. For lower temperatures applications can suitable microprocessors be applied, resulting in that sensorless control, can be realized.

For low-speed applications, the electromechanical unit 20 may be provided with a gearbox 26, as shown in FIG. 3.

In FIG. 2, a variant with parallel electrical connection of the motors' 21a-d windings in each group 24, 25 is shown. While in the case where the motors 21a-d where connected in series only one motor 21a-d in the group 24, 25 is connected to the inverter 16a-b, all windings of the motors 21a-d are connected to the inverter 16a-b when the motors 21a-d are connected in parallel.

Reference is now made to FIG. 3 which describes a possible accommodation of the system components, i.e. the electronics unit 11 and the electromechanical unit 20, in a housing 30, made of housing sections 31, 32. A gearbox 26, which is often a part of the system, when the system is designed for low-speed applications, is also shown in FIG. 3. The housing 30 is preferably made of sections 31, 32, which sections 31, 32 are connected by means of simple subs 33 or subs 34 with couplings, i.e. shaft connections inside. The simple subs 33 are preferably used between the section 31 containing the electronic unit 11 and section 32 containing the electromechanical unit 20, while the subs 34 with couplings are used between sections 32 containing parts of the electromechanical unit 20.

Reference is now made to FIG. 4a-b which show a "bendable" system, where FIG. 4a shows an embodiment where all the connections between sections 31, 32 of the housing 30 are flexible connections 35 and FIG. 4b shows an embodiment where only connections between sections and 31 and 32, and between sections 32 containing motor groups 24, 25 are flexible connections 35. Couplings between motors 21a-d in one group and between groups 24, 25 may be of different type. There can be hydraulic change of angle between the adjacent sections. Channels in the motors can be used for through passage of the fluid of the hydraulic system.

Referring now to FIGS. 5a-b which show the use of the system according to the invention. In FIG. 5a is shown an application where the electronics unit 11, electromechanical unit 20 and gear 26 are located together in a well 40.

In FIG. 5b is shown an application suitable to reduce thermal influence of the motors 21a-b and gear 26 on the electronics unit 11, the later part may be disposed in the well 40 separately. In this case a relatively short AC cable 41 is used between the electronics unit 11 and the electromechanical unit 20, and a long DC cable 42 is used for supplying the electronics unit 11 from the surface.

The negative thermal influence from the motor unit on the electronics may be caused when, for example, the motor is coupled with a drill.

In systems where high survivability is the requirement, the system according to the invention is arranged to remain in operation if one motor or one inverter fails.

If one of the motors fails and the inverter driving it survives, the inverter opens switches and the motor, as well as the other motors driven from the same inverter, gets completely electrically isolated from the rest of the system. The remaining motors continue operation. The system then runs with reduced torque and power, but in some applications it may be advantageous, for example, for gradual system shut down. There is also a possibility that other motors may work with increased load for a short time to maintain total system torque and power.

The same relates to the case when one of the inverters trips or fails, but is not damaged completely, for example when it is by some reason overheated.

MODIFICATIONS

The invention is described on the example of permanent magnet machine. The same principles are valid for other machines types, for example reluctance, hybrid PM/reluctance or induction machines.

Any of the machines may be run in motoring or generating mode. In certain situations the system may transfer from one mode to another and back.

It is typical to have capacitors in the DC-link to attenuate oscillations due to inverters' switching. However, in some applications, for example in high-temperature ones, capacitors become vulnerable and it is desirable to get rid of them by using other solutions. In this invention it is suggested to apply special control strategy, namely switching the DC/AC individual inverters in a synchronous phase control scheme, to reduce input ripple in the DC-link lower and make use of capacitors not necessary, or at least to reduce size of the capacitor bank.

The proposed system may have a separate housing or be integrated in a tool, for example drilling unit or an ESP, i.e. may be accommodated into the same housing together with the driven mechanism.

The invention claimed is:

1. A system for driving mechanisms in narrow remote locations, like downhole, in a well (40), pipeline or a tunnel, supplied with DC voltage via a long cable (42), comprising:

a power & control electronics unit (11) comprising
a control system (13) operatively connected to a power line communication module (12), a DC/DC buck converter (15), and at least one of a plurality of DC/AC inverters (16a-16b), wherein the power line communication module is configured to deliver power from a source to the electronics unit (11) and is electrically connected to the DC/DC buck converter (15) which is electrically connected to each of the plurality of DC/AC inverters via a common DC bus (14), and an electromechanical unit (20) comprising:
a plurality of electric rotating motors (21a-d) each having a shaft, said motors axially aligned and mounted mechanically in series by connecting first and second ends of said shafts by means of a coupling (23), wherein said power and control electronics unit (11) and said electromechanical unit (20) are connected by power and control cables extending between said DC/AC inverters (16a-b) and said motors (21a-d), said motors (21a-d) being divided into a plurality of groups (24, 25) of a plurality of motors with each respective group being connected to a single DC/AC inverter (16a-b) such that each inverter (16a-b) runs at least two motors (21a-d), and windings of motors (21a-d) in each respective group (24, 25) are connected in series such that said windings of only a single motor (21a-b) in each group is directly connected to the respective DC/AC inverter.

2. A system according to claim 1, wherein the system is arranged to run in sensorless mode or that said electromechanical unit (20) includes at least one position sensor for operation based on position information from said position sensor.

3. A system according to claim 1, wherein the system is a direct drive or includes a gearbox (26) arranged at an end of said electromechanical unit (20).

4. A system according to claim 1, wherein said power and control electronics unit (11) and said electromechanical unit (20) are accommodated in an elongated housing (30).

5. A system according to claim 4, wherein said power and control electronics unit (11) and said electromechanical unit (20) are accommodated in separate sections (31, 32) of said housing (30).

6. A system according to claim 1, wherein either said power and control electronics unit (11), or said electromechanical unit (20), or both said electronics unit and said electromechanical unit are integrated in a tool, such as a drilling tool or electric submersible pump.

7. A system according to claim 1, wherein said windings of said motors (21a-d) in each of said groups (24, 25) are connected in parallel, such that windings of each motor (21a-d) in said group (24, 25) are connected directly to said DC/AC inverter (21a-d).

8. A system according to claim 1, wherein operation of DC/AC inverters (16a-b) is synchronized so that in each of said groups (24, 25) of motors (21a-d) a torque density is equal.

9. A system according to claim 1, wherein one of said DC/AC inverters (16a) is arranged to be a "master" and is provided with a speed or torque reference from said control system (13), while said second inverter (16b) is arranged to be a "follower" and is provided with an equal torque reference from said "master" DC/AC inverter (16a).

10. A system according to claim 8, characterized in that torque references applied to said DC/AC inverters (16a-b) by said control system (13) are proportional to a length of active parts of said motors (21a-d) in said group (24, 25) fed from said inverters (16a-b).

11. A system according to claim 1, wherein said motors (21a-d) are operated at a variable speed and torque.

12. A system according to claim 1, wherein said motors (21a-d) are selected from a group consisting of a permanent magnet motor, an induction motor, a reluctance motor or a hybrid motor.

13. A system according to claim 12, wherein said motors (21a-d) are operated in a generator mode.

14. A system according to claim 5, wherein said elongated housing (30) further comprises:
simple subs (33) between said sections (31,32) of said housing (30),
subs (34) with couplings between sections (32) of said housing (30), or
flexible connections (35) between all sections (31, 32) or only sections (32) of said housing (30), or a combination thereof.

15. The system according to claim 8, wherein the system is arranged to maintain its operation if one of said DC/AC inverters (16a-b) or one of said motors (21a-d) fails, such that the rest of the system maintains operation.

16. A system according to claim 1, wherein said couplings/joints (23) are homocinetic couplings wherein an instantaneous angle between a rotor of said motor (21a-d) and an associated stator is substantially identical for each said motor (21a-d) in the group (24, 25), except for an offset due to twisting of said shaft (22) and slack in said couplings/joints (23).

17. A system according to claim 1, wherein said power and control electronics unit (11) and electromechanical unit (20) are located at a distance from each other by means of a relatively short AC cable (41) to prevent negative thermal influence of the latter one on the former one.

18. A system according to claim 1, wherein no capacitors are used in the DC-link or a size of said capacitor bank is considerably reduced by switching the individual inverters (16a-b) in a synchronous phase control scheme by reducing an input ripple in the DC-bus (14).

* * * * *